United States Patent [19]

Gagnon

[11] Patent Number: 5,576,546
[45] Date of Patent: Nov. 19, 1996

[54] DEPTH-OF-INTERACTION NORMALIZATION OF SIGNALS FOR IMPROVED POSITIONING, AND ENERGY RESOLUTION IN SCINTILLATION CAMERA

[75] Inventor: Daniel Gagnon, Blainville, Canada

[73] Assignee: Park Medical Systems Inc., Lachine, Canada

[21] Appl. No.: 230,145

[22] Filed: Apr. 19, 1994

Related U.S. Application Data

[63] Continuation-in-part of Ser. No. 967,318, Oct. 28, 1992, abandoned.

[51] Int. Cl.⁶ .................................................. G01T 1/164
[52] U.S. Cl. ....................................... 250/369; 250/363.07
[58] Field of Search ............................... 250/363.07, 369

[56] References Cited

U.S. PATENT DOCUMENTS 5,285,072  2/1994  Klingenbeck-Regn et al. .......... 250/369

*Primary Examiner*—Constantine Hannaher
*Attorney, Agent, or Firm*—Swabey Ogilvy Renault

[57] ABSTRACT

In addition to the traditionally calculated photodetector sum signal or energy value, and X, Y position values, the second order moment of the photodetector signals is calculated from photodetector signals to obtain a value proportional to light spread out in the scintillation camera giving an indication of the depth of interaction "DOI". A position correction vector is selected according to the initially calculated position values and the second order moment value and is added to the initial position values to obtain more accurate scintillation event position values. The correction values can be calculated by interpolation using empirically determined or simulation determined values contained in a table. The method of correction using the second order value proportional to DOI can also be used to correct the first order moment value or energy value.

7 Claims, 4 Drawing Sheets

LIGHT DETECTED (19 PMTs)

A-SHALLOW
(FAR FROM PM PLANE)

B-DEEP
(CLOSE TO PM PLANE)

5,576,546

DEPTH-OF-INTERACTION NORMALIZATION OF SIGNALS FOR IMPROVED POSITIONING, AND ENERGY RESOLUTION IN SCINTILLATION CAMERA

This is a Continuation-in-Part of my earlier patent application Ser. No. 07/967,318 filed Oct. 28, 1992 and entitled "Event-by-Event Positioning and Correction in Scintillation Camera Utilizing Depth-of-Interaction Information Obtained by Geometric Mean", and now abandoned.

TECHNICAL FIELD

This invention relates to a method for performing, event-by-event, the normalization of the (composite) moment signals used for the determination of the event position and energy in a scintillation camera. Depth-of-interaction normalization should first produce a better evaluation at any specific energy and, second, should produce energy-independent estimation throughout the spectrum. All the information available is the response of a set of photosensible devices collecting the light produced by means of a conversion of a gamma ray in a scintillation crystal.

BACKGROUND ART

The prior art is described with particular reference to the field of nuclear medicine imaging, where the present invention is principally, although not exclusively, applied.

Nuclear imaging aims to estimate the spatial, spectral and temporal distributions of a radioisotope by detecting the radiation of the object. One particular detection device used for nuclear medicine imaging is described in U.S. Pat. No. 3,011,057 to Anger. This device analyzes the response of a set of photomultiplier (PM) tubes in order to estimate the energy and the position of a scintillation. Each PM response is proportional to the light created during the scintillation (function of the gamma energy) and to the solid angle subtended by its photocathode (function of the depth-of-interaction, DOI). Since the DOI is usually not available to the estimation process, the mean response is therefore used, implicitly or explicitly, as an approximation. For a given event, deviation from mean parameters will inevitably create errors in the estimation procedure.

The stochastic nature of the gamma ray interaction with the crystal and the fact that only the mean depth-of-interaction is accessible by external measurements, result in non-uniformities and distortions in the detection field. Correction of these non-uniformities has received a lot of attention in the past and different complementary and competitive technologies have been described. U.S. Pat. Nos. 3,745,345 to Muehllehner, 4,142,102 to Lange, 4,228,515 to Genna, 4,316,257 to Del Medico, and 4,475,092 to Arseneau are of particular interest in this context.

While the hereinbefore mentioned methods of the prior art generally perform an adequate mean correction, compensating for the- mean observed distortion both in the spatial and the energy domains, they do not provide optimal correction on an event-by-event basis for they do not take into account the event DOI largely responsible for the variation in these signals.

Methods making explicit use of the DOI in the detection process have already been proposed. Cook et al in "A Thick Angle Camera for Gamma-Ray Astronomy" IEEE Trans. Nucl. Sci. vol. NS-32, pp. 129–133, 1985 proposed to use two or more energies to sample the DOI in the crystal as the mean depth-of-interaction varies with the energy. This approach offers a definite gain over the standard technique but first, the sampling of DOI so obtained is relatively coarse and, second, the sampling is not perfect, as for each individual energy, the detector still integrates the response over all possible DOIs, in other words, this approach is still limited by the fact that the mean response over the DOI and the response at the mean DOI are not equal. A second approach has been proposed by Karp and Daube-Witherson in "Depth-of-Interaction Determination in Nai(TI) and BGO Scintillation Crystals Using a Temperature Gradient" Nuclear Instrumentation and Methods in Physics Research, vol. A260, pp.509–517, 1987. This technique offers the potential of estimating the DOI on an event-by-event basis but can be extremely difficult to realize for it requires a temperature gradient to be applied on the crystal so that the crystal relaxation time is modified. Amplitude of this gradient has to be constant and large enough to produce sufficient modification of the detection signals as the DOI varies.

Rogers and Saylor in U.S. Pat. No. 4,675,526 entitled "Method and Apparatus for 3-D Encoding" described a methodology by which DOI can be obtained directly by signal processing and proper hardware configuration. In addition to restriction in the light distribution, imposed by the fiber optics light guide, the authors state that at least three samples must be taken on the narrowest light spread distribution so that samples must be taken at an area interval of 1 cm or less in two dimension. A summing network (lines and columns) decreasing the burden of the computation in a typical camera of at least 1000 $cm^2$ is then described. The sum of adjacent non-zero lines (on each side of the maximum line) is used as an indicator of the DOI. In fact, it is easily shown that this operation is equivalent to create the square root of the moment of order 2 to be described below. (The use of higher order moment as an indicator of the light dispersion has also been recognized by Yamashita et al. U.S. Pat. No. 4,945,241 in a different context). Elimination of the long tail of the light distribution through fiber optics device in the Roger's proposal is useful to decrease the noise in the calculation only if the access to individual photodetector response is not possible. Indeed, access to individual responses renders the filtering operation obsolete since selection of a cluster of tubes can always be used to eliminate unwanted (noisy) responses. Moreover, the filtering scheme decreases the quality of the total energy signal since the light distribution is not more concentrated but only chopped.

In the present invention, a method for normalizing the conventional photodetector output with respect to the DOI is provided. The method can be implemented in the conventional crystal-photomultipliers arrangement without modification and without the expense of having to put a large number of smaller detectors and light shaping devices. Furthermore, because this invention can be considered as an independent extra step in the prior art (with total energy, moments or centroids in X and Y as the final result), the rest of the chain, including the actual positioning, the correction system as described above can still be used, also without any modification. The object of this invention is to improve the energy resolution and to produce energy independent signals for positioning.

SUMMARY OF THE INVENTION

It is a feature of the present invention to provide a method for processing the individual photodetector responses in a gamma camera to create a signal directly related to the event depth-of-interaction in order to normalize the X and Y moments already performed by the prior art.

It is a further feature of the present invention to use the depth-of-interaction information to infer the ratio of the light detected over the total amount of light emitted in order to estimate the true energy of the event.

It is still a further feature of the present invention to provide a method to use depth-of-interaction information to compensate and correct the position of an event that does not enter the crystal perpendicularly.

It is another feature of the present invention to find the depth-of-interaction by forming a set of moments defined as the weighted sum of a set of photodetector responses, the weight being proportional to the photodetector position elevated to a given power. The set of moments contains at least one moment of order 2 or higher.

It is still another feature of the present invention to produce a series of linear combinations of the original moments sometimes referred to as canonical moments.

According to the above features, from a broad aspect, the present invention provides a method of normalizing the signals of a gamma ray camera as if they were originated from the same predetermined depth. The method comprises analyzing output signals produced by a plurality of photodetectors associated with the crystal as a result of light emitted by the scintillation. From the analyzed output signals, there are produced resultant signals which are proportional to the three-dimensional location of a scintillation in the crystal.

According to a still further broad aspect of the present invention, the steps of analyzing the output signals comprises producing a set of moment signals defined as the sum of the individual output signals of the photodetectors weighted by the distance of each photodetectors to a predetermined reference point. Three moment signals are obtained to determine the three-dimensional location.

According to a still further broad aspect of the present invention, there is further provided the additional step of locating a largest one of the output signals of the photodetectors and determining a center point of a detecting surface of the photodetector having the largest output signal to determine the reference point.

According to the above features, from a broad aspect, the present invention provides a method for processing output signals of a plurality of photodetectors of a gamma camera. The method processes the photodetector output signals in order to produce a set of moment signals defined as the sum of the individual photodetector output signals weighted by the distance of the photodetector to a predetermined reference point, the order of each calculated moment being the exponent of the weight. The photodetector having the largest response (PMmax) is found and the center of its detecting area will act as a reference point for subsequent calculation. The sum of the output signals of the photodetectors is used as the moment of order 0 in the calculation and in the first normalization of the order 1 and 2 moments of the X and Y axes of the total detecting area of the plurality of photodetectors. From this calculation and energy normalization, we obtain four moment signals $M^o$, $M_x$, $M_y$ and $M^2$ in X or Y or any combination of the two (wherein $M^o$ is the energy, Mx is order 1 moment in the X axis, My is the order 1 moment in Y axis and $M^2_x$ or $_y$ is the order 2 moment in the X or Y axis) in order to determine the depth-of-interaction (DOI) of a scintillation produced in a crystal of the gamma camera and the X and Y coordinates of the scintillation within the total detecting area. Depth normalization is obtained by taking the observed moment quadruplet ($M^o$, $M_x$, $M_y$ and $M^2$ or DOI) and interpolate its corresponding value for any given DOI using the tabulated parametric function F($M^o$, $M_x$, $M_y$; $M^2$ or DOI). The function F is obtained from the theoretical or empirical analysis of the light distribution in the crystal assembly.

From the calculated value of the X and Y axes of the detected scintillation, we can determine the angle of the gamma ray that produced the detected scintillation. The DOI of the scintillation is also used to correct the displacement of the X and Y axes associated with gamma rays entering the crystal at an oblique angle.

BRIEF DESCRIPTION OF THE DRAWINGS

A preferred embodiment of the present invention will now be described with reference to the accompanying drawings in which.

DESCRIPTION OF THE PREFERRED EMBODIMENT

Figure 1A:
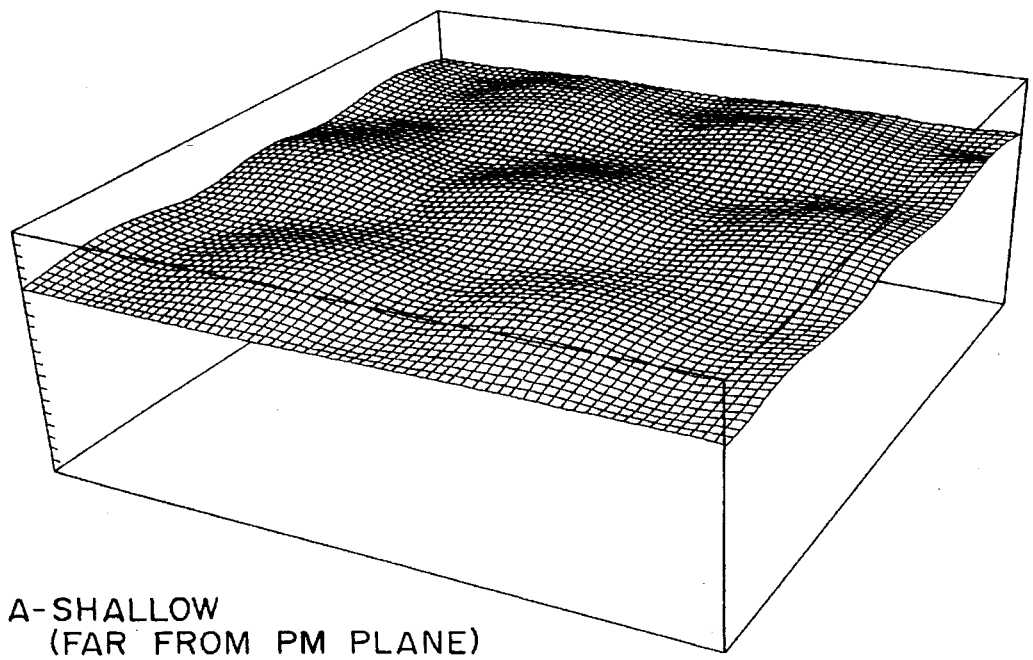
FIG. 1 is a representation of the total amount of light detected (in arbitrary units) by an array of 19 photodetectors for shallow (far from the photodetector plane) and deep (close to the photodetector plane) interactions. For display purposes, the graph has been zoomed to cover only the area of 7 photodetectors although the sum is still calculated with 19.
Figure 1B:
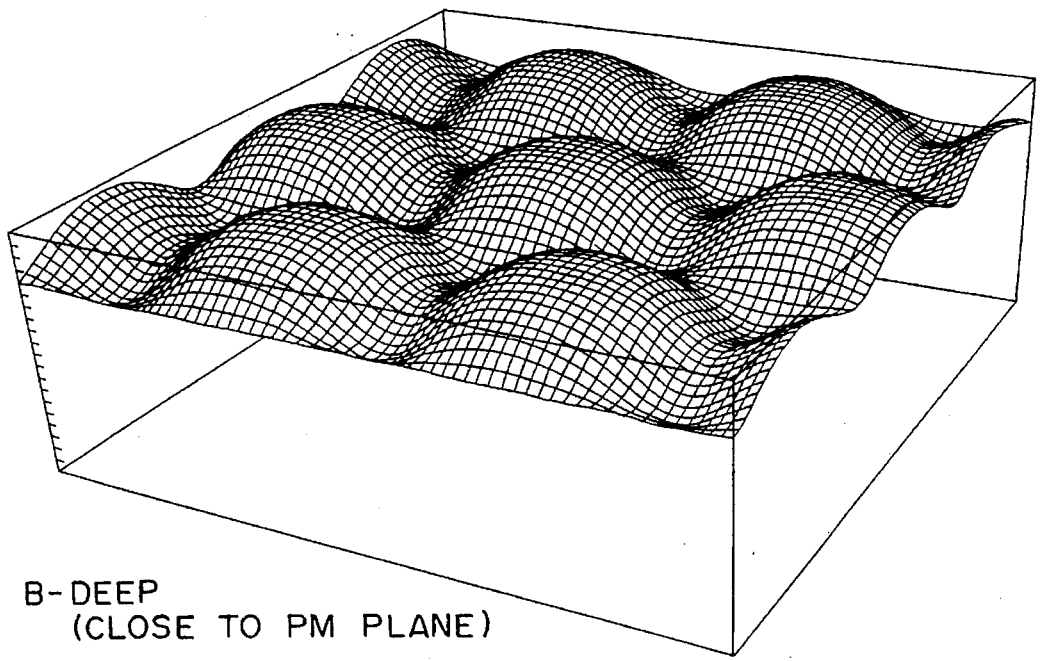

Referring to FIG. 1, there is shown the total amount of light detected by an array of 19 photodetectors for shallow (far from the photodetector plane) and deep (close to the photodetector plane) interactions. For any given X and Y location on this graph, the mean scintillation process will give rise to a light distribution between these two planes. These two surfaces establish very clearly the DOI dependence of the light collection system. This dependence will create an additional variance to the monoenergetic isotope (through the stochastic nature of the gamma interaction in the crystal) and biases between isotopes (as the mean depth will vary with energy).

Figure 2:
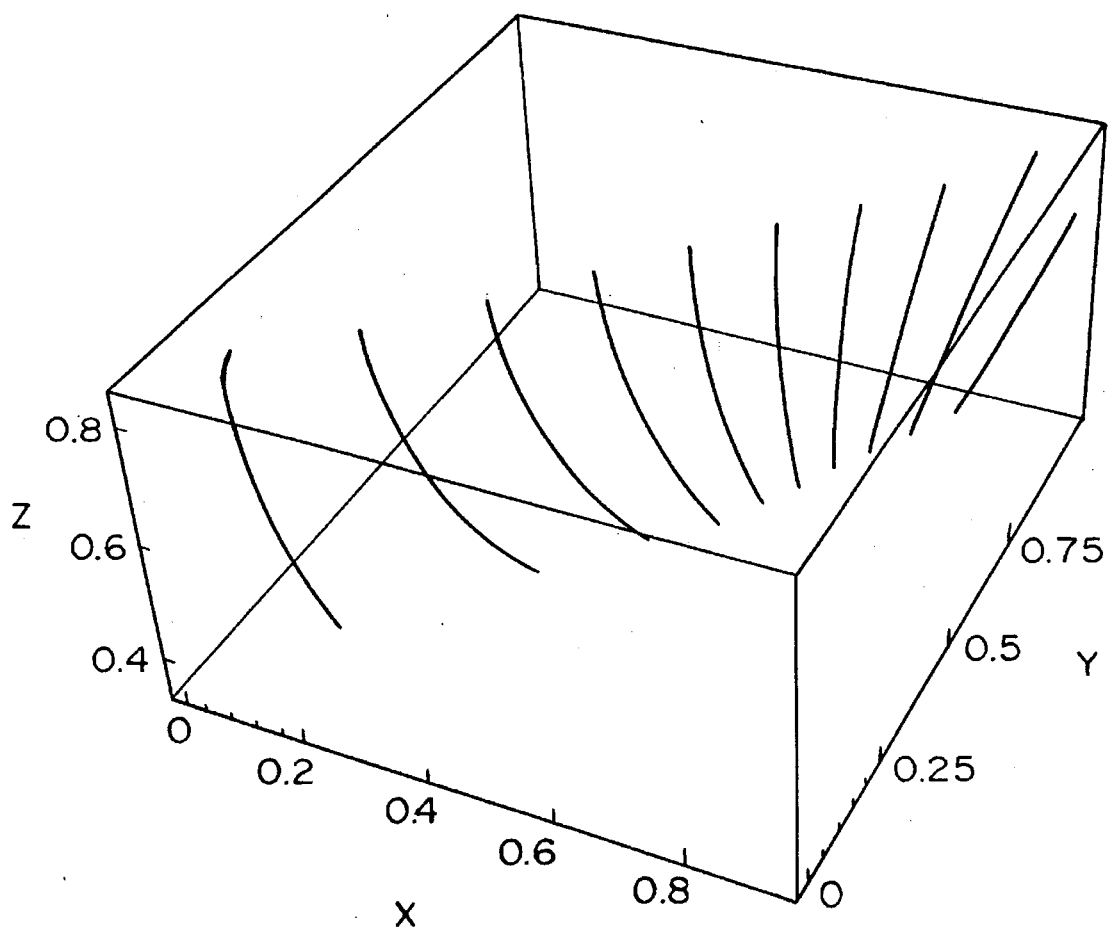
FIG. 2 represents the evolution of the couple formed by the moment in X and the moment in Y as the depth-of-interaction changes. Z is related to DOI through the thickness of the assembly (Z=Thickness—DOI). Z starts from the entrance plane of the crystal to the photodetector plane: the maximum value therefore corresponds to "shallow" event in FIG. 1.

Referring now to FIG. 2, there is shown another way to visualize the DOI dependency. Each curve of the graph represents one $M_x$, $M_y$ couple how the light dispersion can change with Z (where the DOI is linked to Z, the thickness of the assembly through the simple relation Z=Thickness—DOI). Actual range of Z in the graph represents what is found typically in the prior art. This parametric function F($M^o$, $M_x$, $M_y$; $M^2$) will be used to normalize the different moments.

Methods for obtaining DOI parametric function

The DOI parametric function is the key to the normalization process. It tells the relationship between the different moments and the DOI. The way to obtain this information is not trivial.

The first approach would be to infer the different curves from empirical measurements keeping in mind that direct measurement of the DOI is not possible. Indeed, stochastic nature of the interaction makes only the MEAN DOI to be measurable and actual measurement can only cover a part of the possibilities (for obvious reasons, the mean DOI cannot be deeper than 50% of the crystal thickness). Another difficulty in this approach is that, unfortunately, the photodetector mean response (with a stochastic dependence of the depth) is not equivalent to the response at the mean DOI. Any attempt to build the parametric function in this approach will therefore be an approximation, although possibly helpful.

Figure 3:
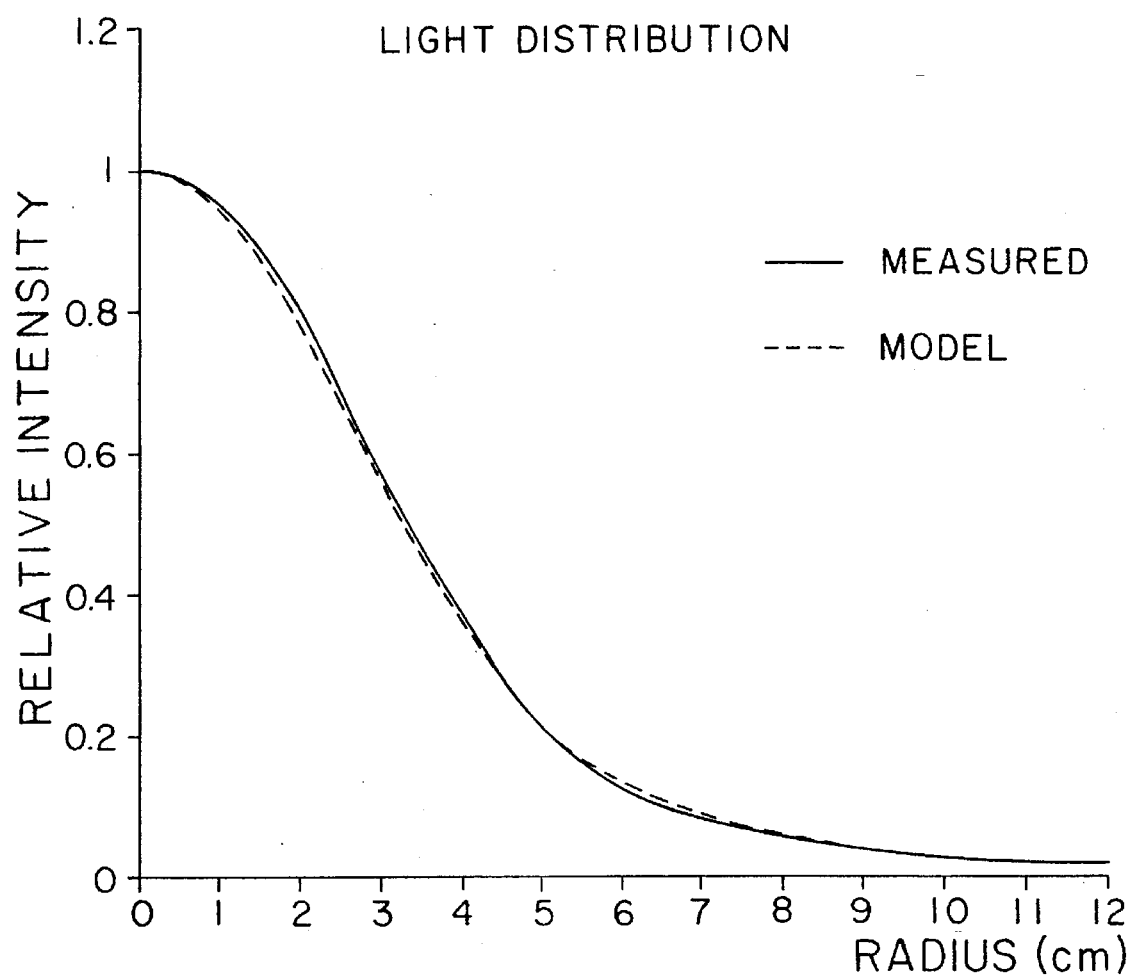
FIG. 3 shows the agreement between the mathematical model and a set of real measurements made on a camera. The curve shows how the MEAN response of ONE photodetector varies with distance.

A second approach would be to develop a mathematical model of the light distribution in the crystal assembly. After validating the model output with actual measurements, it will be possible to analytically generate the parametric curves. FIG. 3 shows an example of such a validation test already published in the literature (S. Rioux et al. "A Light Scattering and Distribution Model for Scintillation Cameras" Proc. of SPIE vol. 1995, San Diego, 1993, J. C. Stover editor.). Curves similar to the one of FIG. 2 can now be generated for any desired combination of moments.

In order to be able to use the parametric function, a variable proportional to the DOI will have to be built. The dispersion, or a moment of order two, has already been described as indicator of the depth in Rogers (U.S. Pat. No. 4,675,526) and Yamashita (U.S. Pat. No. 4,831,263 and U.S. Pat. No. 4,945,241). Implementation of the normalization procedure will now be described.

Implementation of the normalization procedure.

The present invention relies solely on the possibility to obtain DOI related information from the analysis of the response of a set of photodetectors in a gamma camera. The key to the normalization (dependent variable in the interpolation process) is a moment of order 2 (in X, Y or any combination of the two). From the practical point of view, requirements are very simple: the system has to be able to supply the four moments, $M^o$, $M_x$, $M_y$ and $M^2$ in X or Y or any combination of the two (wherein $M^o$ is the energy, $M_x$ is order 1 moment in the X axis, $M_y$ is the order 1 moment in Y axis and $M^2_x$ or $_y$ is the order 2 moment in the X or Y axis). The first three moments are already being produced in the prior art and will only have to be available in digital form, the fourth one is very easy to produce either digitally (from the photodetector individual digital responses) or in analogue form and digitized afterward for further calculations. Although possible, production of the moment in analogue form could be difficult to realize, especially the identification of the photodetector with the maximum response. For this reason, the implementation of the normalization procedure in a camera where ALL the photodetector responses are available in digital form will be given. Such all-digital cameras are now becoming available on the market. The following paragraphs will describe, step-by-step, the normalization procedure.

Step 0. (Off-line computation).

Build the function $F(M^o, M_x, M_y; M^2_x)$ using the simulation program, with a moment of order 2 as an indicator of the DOI for the two extreme planes (where scintillation is possible) of the crystal and name them Table A and Table B. The simulation program, as is known in the art, is a computer model program which will predict photodetector response signals for a given scintillation at a particular point within the crystal. For each X and Y position contained within Tables A and B, the simulation program indicates the photodetector response signals for the two extreme planes, namely the plane closest to the photodetectors and the plane farthest from the photodetectors, both being sufficiently within the scintillator such that a scintillation is possible. Due to geometry and the optics of the particular photodetectors, scintillation crystal and optical coupling therebetween, there will be greater light spread for the scintillations occurring in the plane farther from the photodetectors than in a plane closer to the photodetectors and also the total amount of light received may be different. Using the simulated photodetector response signal values, the table values which need to be calculated are the values indicated at reference numeral 9 in FIG. 4. The values $M_{x\text{-}A}$ and $M_{x\text{-}B}$ are the amount of deviation in the x direction at the A and B planes respectively between the x position of the scintillation being simulated and the x position as was calculated using the simulated photodetector response signal values. Thus, the simulation program calculates the response signals of the photodetectors for a scintillation at a point in plane A. The position of the scintillation is then calculated as the first order moment in X and Y. The difference between the simulated scintillation point and the first order moment is $M_{x\text{-}A}$ and $M_{y\text{-}A}$. The simulation is repeated for a point in plane B for $M_{x\text{-}B}$ and $M_{y\text{-}B}$. Each table entry is the result of a simulation. The Tables A and B can also be built-up using empirical results.

Step 1.

Access the digital photodetector responses. It has been established that this first step is not, strictly speaking, an absolute prerequisite. Step 1 through Step 5 could, in theory, be made in the analogue way.

Step 2.

Identify the photodetector with the maximum response (PMmax). It will then be assumed that this photodetector is the closest to the scintillation. Neither the preferred nor the optimum way to find the PMmax are discussed here since it seems obvious that such a technique exists and should not limit the implementation of the current invention.

Step 3.

Identify from the PMmax, the list of N photodetectors forming a cluster around it. Clusters of 7, 13 and 19 or more are natural choices for N since they form a symmetrical cluster around the PMmax but any number can be selected provided that the number N is coherent throughout all the calculations. Since the neighborhood of any given photodetector is stable, it is easy enough to put the list of N neighbors in a predefined table. Actual selection of N could take into consideration the noise level and could vary with imaging conditions and with desired results.

Step 4.

Access the N photodetector responses, that is, bring the N photodetector responses to a computer means.

Step 5.

Build the set of four raw moments R according to this general formula $$R_x^i = \sum_{k}^{N} X_k^i \Omega_k$$

where $X_k$, and $\Omega_k$ are the coordinates and the response of the $k^{th}$ photodetector, N is still the number of photodetectors in the cluster and i is the order of the moment (the same applied on the Y axis).

Step 6.
Do the energy normalization.

$$M^i_x = R^i_x / R^0$$

Step 6 (optional).
Statistical sciences predict that linear combination of the original moment vector might describe more appropriately the physics of the problem. This additional step could easily be implemented after the energy normalization.
Step 7.
Find in the Table A the couple ($M_{x-A}$; $M_y$-A) closest to the observed couple ($M_x$; $M_y$) and its corresponding couple ($M_{x-B}$; $M_{y-B}$) in Table B.
Step 8.
Access in Table A the value of the DOI-related variable $M^2_{x-A}$ and its equivalent value in Table B $M^2_{x-B}$
Note:
Moment of order 2 is in X or in Y or any combination of the two. Rogers et al (U.S. Pat No. 4,675,526) use $M_R = (M^2_x + M^2_y)1/2$.
Step 9.
Compute the normalized moment $M^*_x$ in X using simple linear interpolation formula:

$$M^*_x = M_x - \left[ (M_{x-B} - M_{x-A}) \left[ \frac{M^2_{x-B} - M^2_x}{M^2_{x-B} - M^2_{x-A}} \right] \right]$$

Note: the same technique is repeated on Y, i.e. $M^*_y$ is calculated using the position value $M_y$ and the table values $M_{y-A}$, $M_{y-B}$, $M^2_{y-A}$ and $M^2_{y-B}$.
Step 10.
Send the normalized moments $M^*_x$ and $M^*_y$ to the rest of the chain for final positioning. Additional information on the energy and/or the actual DOI can also be sent with further calculation and provided that the positioning algorithm can accept this extra information. The energy value $M^0$ can be corrected in the same way that the X and Y position values were corrected in the Steps 7 through 9 using appropriate energy correction value tables containing values $M^0_A$ and $M^0_B$ instead of the pairs of $M_{x-A}$, $M_{y-A}$ and $M_{x-B}$, $M_{y-B}$ values while using the same $M^2_x$ or $M^2_y$ values.

Figure 4:
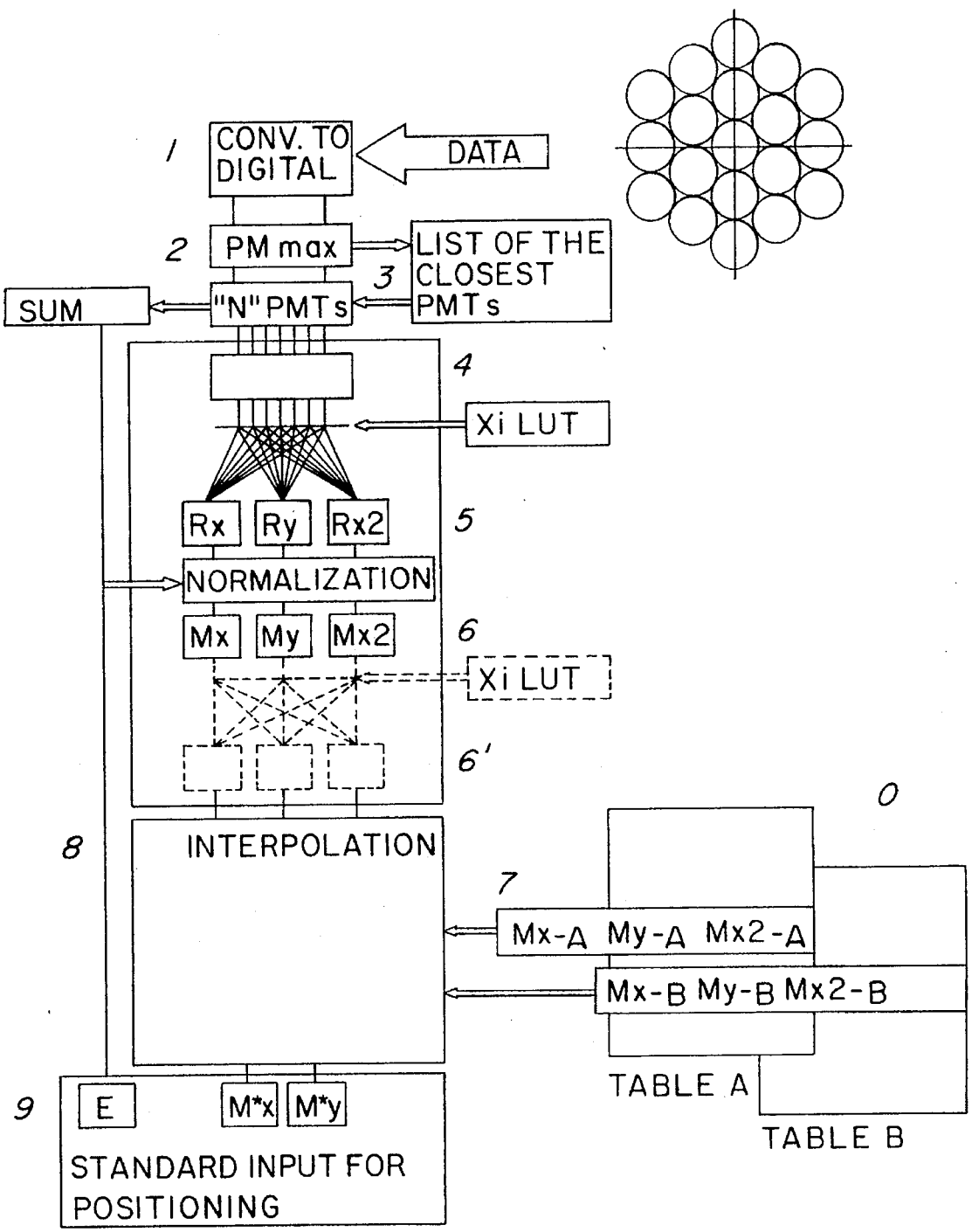
FIG. 4 is a schematics of a typical implementation of the DOI normalization technique and its relation to conventional apparatus which should accept input as defined in Step 9. Prior information on the DOI and its relation to the moments is formatted in Step 0.

With reference to FIG. 4, there is summarized the possible implementation of the present invention from Step 0 through step 9.

ADDITIONAL INFORMATION

The current implementation can be slightly modified in order to obtain information on the position and energy of the original event. Implementation of these two additional parameters would require closer link to the rest of the device, and this information is not usually available in prior art. Again, normalization of moments can be considered as an additional step in the conventional chain of operation otherwise unchanged.

It is clear that FINAL estimation of the position (X and Y), the energy and the obliquity correction (that requires the X and Y positions) cannot be made. Empirical data are indeed required to take into account crystal non-uniformities (in sensitivity and efficiency), photodetector discrepancies, varying level of noise in the amplification chain and so forth. DOI normalization provides better signal to start with in the actual positioning and correction procedures. On the other hand, "internal" information on the DOI such as the relative position, actual DOI (as opposed to second order moment used in the interpolation), corrected moment 0 (energy) can be passed on to the following step for further usage. For instance, knowledge of the pure geometry of the light geometry might permit the estimation of the crystal non-uniformity for quality control purposes, and the DOI and the knowledge of the collimation geometry might be used to estimate the obliquity correction when the gamma does not enter the crystal perpendicularly.

I claim:

1. A method for determining a scintillation event position value in a scintillation camera having an array of photodetectors optically coupled to a scintillator, comprising steps of:

measuring photodetector light intensity signals from the scintillation event;

calculating first order moment values, $M_x$ and $M_y$, from said intensity signals to obtain initial position values;

determining a second order moment light dispersion value $M^2_x$ or $M^2_y$, from said intensity signals indicative of scintillation event light spread-out and thus a depth of the scintillation event in the scintillator;

obtaining predetermined correction values for said initial position values and said light dispersion value; and applying said correction values to said initial position values to obtain said scintillation event position value.

2. The method as claimed in claim 1, wherein said predetermined correction values are obtained from a look-up table, said look-up table having a dimension for X position, Y position and light dispersion value.

3. The method as claimed in claim 2, wherein said predetermined correction values are calculated by interpolation of said values stored in said look-up table.

4. The method as claimed in claim 1, wherein said scintillation camera is operated with a collimator device to receive gamma rays at a non-normal entry angle, and said correction devices are applied to said initial position values to adjust said initial position values to position values which intersect a single plane of said scintillator through which a line of travel of a gamma ray causing said scintillation event would pass.

5. A method for determining a scintillation event value in a scintillation camera having an array of photodetectors optically coupled to a scintillator, comprising steps of:

measuring photodetector light intensity signals from the scintillation event;

calculating a sum value of said intensity signals to obtain a zero order moment $M_0$ initial energy value;

calculating first order moment values, $M_x$ and $M_y$, from said intensity signal to obtain initial position values;

determining a second order moment light dispersion value $M^2_x$ or $M^2_y$, from said intensity signals indicative of scintillation event light spread-out and thus a depth of the scintillation event in the scintillator;

obtaining a predetermined correction value for said initial position values and said light dispersion value; and applying said correction value to said initial energy value to obtain said scintillation event energy value.

6. The method as claimed in claim 5, wherein said predetermined correction values are obtained from a look-up table, said look-up table having a dimension for X position, Y position and light dispersion value.

7. The method as claimed in claim 6, wherein said predetermined correction values are calculated by interpolation of said values stored in said look-up table.

* * * * *